No. 702,386. Patented June 10, 1902.
D. Y. WILSON.
COW MILKER.
(Application filed June 19, 1901.)
(No Model.) 2 Sheets—Sheet 1.
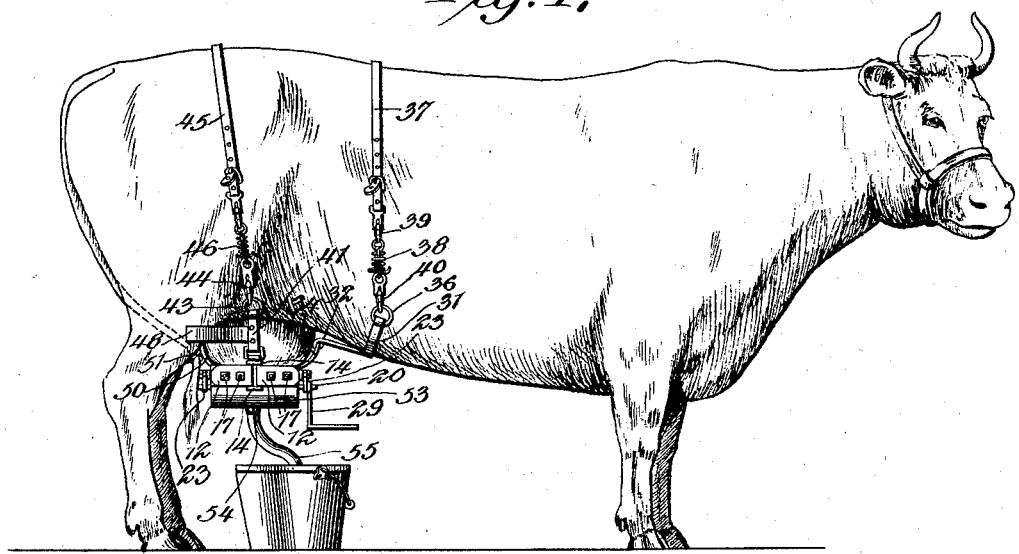
Fig. 1.
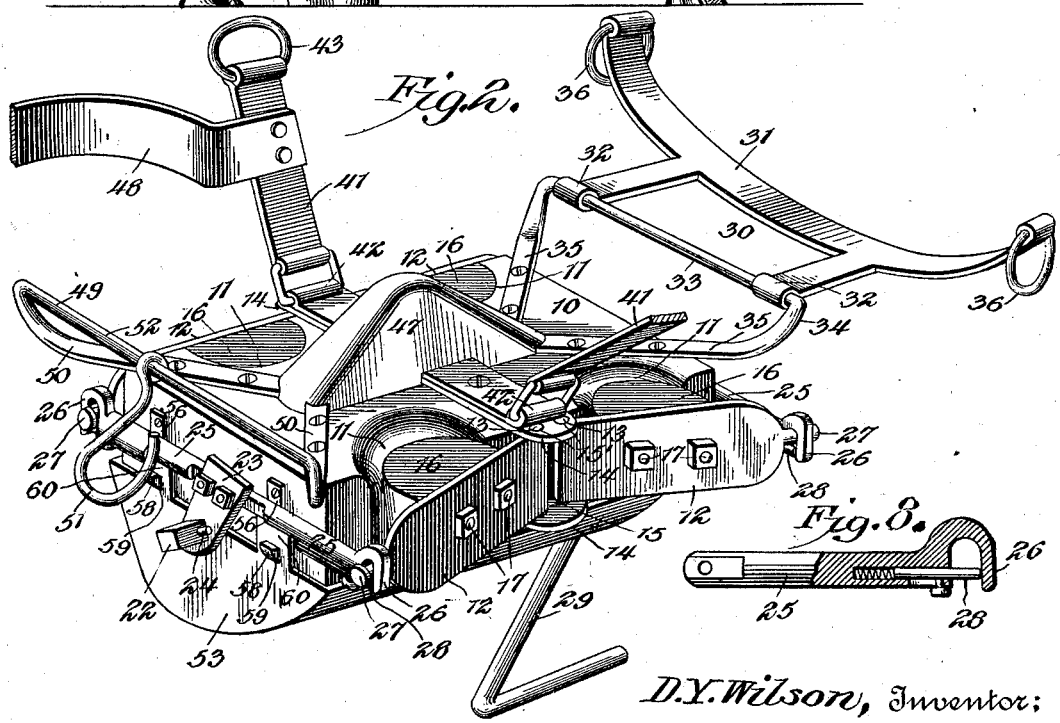
Fig. 2.
Fig. 3.
D. Y. Wilson, Inventor;
Witnesses No. 702,386.  
D. Y. WILSON.  
COW MILKER.  
(Application filed June 19, 1901.)  
Patented June 10, 1902.
(No Model.)  
2 Sheets—Sheet 2.
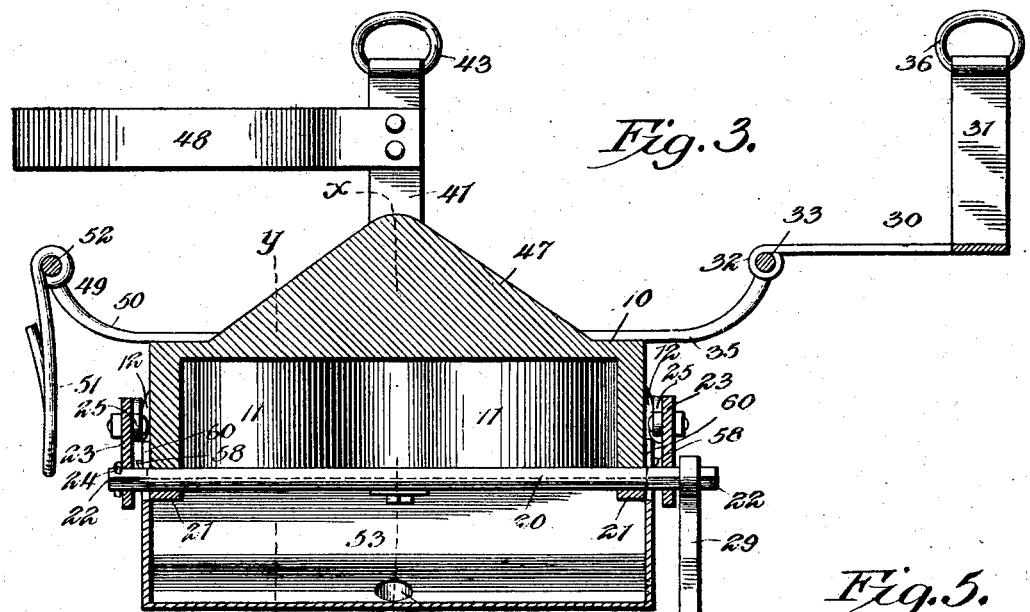
Fig. 3.
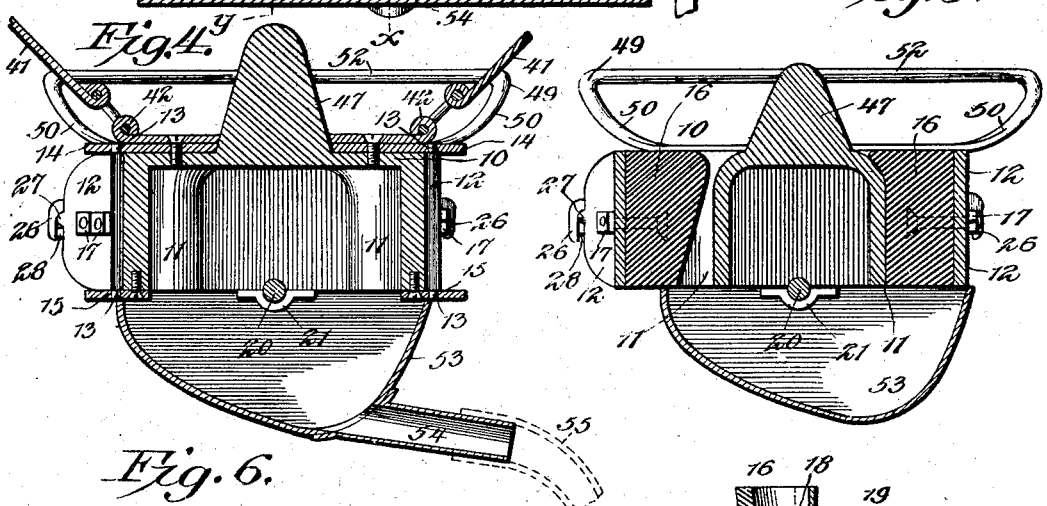
Fig. 4.  Fig. 5.
Fig. 6.
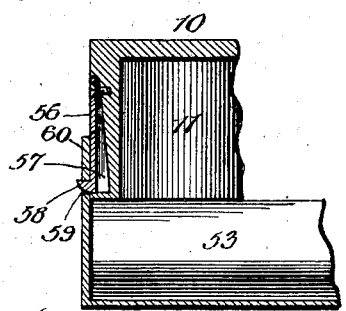
Fig. 7.
D. Y. Wilson, Inventor:
Witnesses  
Howard T. Orr.  
B. G. Foster.
By  
E. G. Siggers  
Attorney
THE NORRIS PETERS CO., PHOTO-LITHO., WASHINGTON, D. C.

UNITED STATES PATENT OFFICE.

DAVID Y. WILSON, OF COCHRANVILLE, PENNSYLVANIA, ASSIGNOR OF ONE-HALF TO ROBERT HAMILL, OF COCHRANVILLE, PENNSYLVANIA.

COW-MILKER.

SPECIFICATION forming part of Letters Patent No. 702,386, dated June 10, 1902.

Application filed June 19, 1901. Serial No. 65,179. (No model.)

*To all whom it may concern:*

Be it known that I, DAVID Y. WILSON, a citizen of the United States, residing at Cochranville, in the county of Chester and State of Pennsylvania, have invented a new and useful Cow-Milker, of which the following is a specification.

The present invention relates to cow-milkers; and the broad object or aim is to provide a simple and comparatively inexpensive machine by means of which a cow may be rapidly and thoroughly milked with little labor and without in any manner injuring or hurting the animal.

More particularly one of the features of the invention resides in novel teat-engaging mechanism which is arranged to operate upon a teat in practically the same manner as a human hand, so that there will be no frictional or other engagement that will rub and chafe the animal operated upon.

A further feature resides in an independent pressure device for each teat and a detachable connection between the same and the operating mechanism, whereby the milker may be more readily applied and in the case of certain teats being useless avoiding the necessity of adjusting the mechanism to and operating it upon the same.

A further and important feature is an udder-pressing device that acts in such a manner as to prevent the cow "holding up" her milk, the device acting in much the same way as the young of an animal. In connection with this there is also employed yielding means for supporting the milker, so that it will always maintain its operative relation despite the contraction of the udder due to the extraction of the milk therefrom. Still further features reside in means for supporting the milker rigidly upon a cow and also in novel means for preventing kicking.

In the accompanying drawings there is illustrated an embodiment of the invention that is at present considered preferable. The construction and operation of the same are fully described in the following specification; but it is to be understood that the invention is not limited to the embodiment shown and described, but is open to such modification and change as is warranted by the scope of the appended claims.

In the drawings, Figure 1 is a side elevation of a cow, showing the improved milker applied thereto. Fig. 2 is a perspective view of the milker detached. Fig. 3 is a longitudinal vertical sectional view. Fig. 4 is a transverse section taken on the line X X of Fig. 3. Fig. 5 is a similar section taken on the line Y Y of Fig. 3. Fig. 6 is a detail section more clearly illustrating the manner of attaching the milk-receiving funnel. Fig. 7 is a detail sectional view of a slightly-modified form of pressure-block. Fig. 8 is a detail view of one of the latches shown partly in section in order to more fully illustrate the spring-pressed bolt.

Similar reference-numerals designate corresponding parts in all the figures of the drawings.

In carrying out the present invention a body is provided, (designated as a whole by the reference-numeral 10.) This body preferably comprises a hollow casting having a flat upper face and provided in its opposite side edges with the recesses 11, constituting teat-receptacles. The pressure elements are pivoted on opposite sides of the body and are composed of the leaves 12, having oppositely-disposed studs 13 at one end. Each set of these leaves is pivoted between the recesses 11 by providing ears 14, having openings 15, in which the studs 15' engage. Blocks 16 are secured to the inner faces of the several leaves, preferably by means of bolts 17 or other fastening devices. In the preferred form the plugs 16 are solid and taper from their upper toward their lower ends, being rounded, so as to conform substantially to the shape of the recesses 11. In Fig. 7, however, there is illustrated a slightly-modified form. In this construction the outer block is made hollow, the outer face, however, conforming to the contour of the recess. To prevent the yielding wall collapsing, a coiled spring 18 is interposed between the same and the adjacent face of the leaf 12, and the bolt 19 passes through this spring and has its head embedded in the yielding wall, while its opposite end is slidable through the leaf.

The operating mechanism for the pressure device is as follows: A longitudinally-disposed rock-shaft 20 is secured to the under side of the body by means of the clips 21, said rock-shaft preferably having its ends projecting beyond the body and squared, as shown at 22. Crank-arms 23 are mounted upon the projecting portions of the shaft, being held in place by cotter-pins 24 or other suitable devices. Latches 25 are pivoted to these crank-arms and have hooks 26 at their outer ends that are arranged to engage over studs 27, projecting from the free ends of the leaves 12. Spring-pressed bolts 28 may be employed in connection with the hooks 26 for locking said hooks in place. A handled crank 29 is placed upon one of the projecting ends of the shaft, as clearly shown in Figs. 1 and 3. By this construction it will therefore be seen that when the handled crank is oscillated the crank-arms 23 will be correspondingly moved, and as a consequence the pressure devices upon one side will be moved into while those of the other will be moved out of their respective recesses.

In order to properly support the device upon a cow and rigidly hold the same in operative position, a positioning-frame (designated as a whole by the reference-numeral 30) is provided. This frame comprises a curved body-band 31, having hinge-eyes 32, projecting from one of its edges and pivoted upon the cross-bar 33 of a bail 34, the arms 35 of which are fastened upon the upper face of the body. The terminals of the body-band 31 are provided with rings 36. A supporting-strap 37 is arranged to be placed over a cow's back and carries at its ends coiled springs 38, preferably secured thereto by means of snap-hooks 39. The free ends of these springs also carry snap-hooks 40, which are arranged to engage the rings 36 of the body-band, as is clearly illustrated in Fig. 1. By this means the body-band is held tightly against the under portion of the cow, and all movement of the machine when in place is avoided. The springs 38 allow for any necessary movement of the cow—as, for instance, its breathing. The milker-body-supporting device consists of plates 41, pivotally secured to the opposite sides of the body by means of ears 42, which ears are preferably fastened to the upper face of the body between the recess thereof. The upper ends of these plates carry rings 43, which are arranged to be engaged by the terminal snap-hooks 44 of a supporting-strap 45, constructed similarly to the strap 37 and having the interposed springs 46.

In connection with the milking devices described there is employed an udder-pressing projection 47, that is preferably though not necessarily made integral with the body. This projection is substantially pyramidal in form and is located upon the upper face of the body between the teat-receptacles. The several edges, as well as the apex, are rounded, so as to avoid any sharp angles or corners.

To prevent the animal's kicking when the device is in place, leg-engaging arms 48 are provided. These arms are each secured at one end to one of the plates 41 and curve outwardly, being arranged to engage the front portion of one hind leg. A tail-holding device is also employed. To this end a bail 49 is secured by its arms 50 to the rear end of the body, and a hook 51 is pivotally and slidably mounted upon the cross-bar 52 of said bail. Located beneath the body is the metallic receiving-funnel 53, preferably made of sheet metal and having a discharge-spout 54, to which may be attached a conveyer-tube 55. Spring-latches 56 (clearly illustrated in Fig. 6 of the drawings) are secured in recesses 57 of the body, the free ends of said latches being provided with hooks 58, that engage in openings 59, made for the purpose in upstanding projections 60, arranged on the opposite ends of the funnel.

The manner of applying the milker is as follows: The supporting-straps are placed over the body of the cow and adjusted properly, as shown in Fig. 1. The pressing-leaves 12 are unlatched from the crank-arms of the operating-shaft and are thrown to open position, so that the teats of the animal may be readily placed in their proper receptacles. This will bring the udder-pressing projection 47 directly between the teats, and it will press upwardly upon the udder between the same, so that it will be impossible for the animal to "hold up" her milk. When the teats have been properly positioned, the leaves are latched to the crank-arms, whereupon by oscillating the crank-handle the pressure will be brought to bear alternately on opposite sides, as above explained. The positioning-frame will be held tightly against the animal and will prevent any side swaying of the milker while in place. The arms 48 will engage the front portions of the legs, and as the animal in kicking must necessarily move said portions forward and such movement is prevented by the arms it will be impossible for the animal to kick. The tail is drawn between the legs of the animal and held there by means of the hook 51, thus preventing any undesirable switching.

The manner in which the pressure devices operate is clearly illustrated in Fig. 5. Because of the tapered construction of the pressure-blocks it will be seen that when said blocks are first moved into the recess and against the teat the upper portion of said teat will be pressed against the adjacent wall of the recess, thus holding the milk contained therein from being forced upwardly into the udder. As the inward movement of the block progresses the lower portions will be brought into contact and the milk thus pressed out. As soon as the pressure is relieved upon two of the teats the machine begins to operate upon the two on the opposite side, so that there is an alternate operation upon the opposite sets. The milk thus extracted falls into the funnel and, discharging through the spout thereof, may be conducted to any suitable reservoir, a pail being shown in the present instance. As the udder contracts because of the extraction of the milk therefrom the springs of the body-straps will correspondingly raise the milking-machine and keep it in proper position, so that the teats will always remain in their receptacles, and the udder-pressing device will be in its proper relation.

By the above construction very important advantages are obtained. In the first place the entire structure is open, so that it may be easily and thoroughly cleansed, a very important factor in machines of this class. Furthermore, the detachable connections of the pressure devices with the operating mechanism affords means for the more ready application of the milker. Outside of this, however, an important advantage is gained for the reason that, as is very often the case, certain teats are inoperative and useless, and it avoids the necessity of adjusting the machine to the same or operating upon them. In such a case it is only necessary to leave the corresponding pressing devices unlatched from the operating mechanism. By means of the inclined arrangement of the pressing-blocks a more natural operation is performed upon the teat, and there is no rubbing or frictional engagement. The udder-pressing device acts in much the same manner as the nose of a young animal when obtaining milk and prevents the cow from retaining the same within the udder.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by means of Letters Patent, is—

1. In a cow-milker, the combination with the body having open-sided teat-receiving recesses in its opposite side faces, of pressure elements pivoted to the body and extending across the open sides of the recesses, and operating means located between and having separate connections with each of the pressure elements for simultaneously and positively moving those of one set into and those of the other set out of their respective recesses.

2. In a cow-milker, the combination with a body having teat-receiving receptacles, of movable pressure devices operating in said receptacles, and means for operating the pressure devices, said means having independent detachable connections with certain of said devices.

3. In a cow-milker, the combination with a body having open-sided recesses in its opposite faces, of pressure elements pivoted upon the body and movable out of and into the recesses through their open sides, a shaft mounted upon the body, and separate connections between the shaft and each of the pressure elements to positively move them out of and into the recesses on the movement of the shaft.

4. In a cow-milker, the combination with a body having teat-receiving recesses in its opposite faces, of pressure elements movably mounted upon the body and movable out of and into the recesses, a shaft mounted longitudinally upon the body between the opposite recesses, and connections between the shaft and the pressure elements.

5. In a cow-milker, the combination with a body having teat-receiving recesses in its opposite faces, of pressure elements movably mounted upon the body and movable out of and into the recesses, a shaft mounted upon the body, and independent detachable connections between the shaft and the pressure elements.

6. In a cow-milker, the combination with a body having teat-recesses in its opposite faces, of independent pressure elements movably mounted upon the body and movable out of and into their respective recesses, a shaft mounted upon the body, and an independent detachable connection between the shaft and each pressure element.

7. In a cow-milker, the combination with a body, having teat-receptacles, of pressure elements movably mounted upon the body and movable out of and into the receptacles, a rock-shaft also mounted upon the body and having crank-arms, and an independent detachable connection between the crank-arms and each pressure device.

8. In a cow-milker, the combination with a body having recesses in its opposite faces, of pressure-plates pivoted to the body and carrying yielding blocks that are movable into and out of the recesses, a rock-shaft mounted upon the body between the recesses and having crank-arms, and latches connecting the plates and the crank-arms.

9. In a cow-milker, the combination with a body having recesses in its opposite faces, of pressure-plates pivoted to the sides of the body and between the recesses thereof and carrying yielding blocks that are movable into and out of said recesses, a rock-shaft journaled upon the body and having crank-arms, and latches pivoted to the crank-arms and detachably engaging the free ends of the plates.

10. In a cow-milker, the combination with a body having spaced teat-engaging elements, of a rigid udder-pressing device located upon the body between the teat-engaging elements, and yielding supporting means connected to the body for supporting the same in operative relation to a cow's udder.

11. In a cow-milker, the combination with a body having spaced teat-engaging elements, of a rigid udder-pressing device located upon the body between the teat-engaging elements and projecting above the upper face of the same, and means for yieldingly suspending the body in operative relation to a cow's udder.

12. In a cow-milker, the combination with a body having spaced teat-engaging elements, of an udder-pressing device located upon the body between the teat-engaging elements and projecting above the upper face of the same, and yielding supporting means connected to the body and arranged to engage a cow to hold said body in operative relation to the udder thereof.

13. In a cow-milker, the combination with a body having spaced teat-engaging elements, of a rigid udder-pressing device located upon the body between the teat-engaging elements and projecting above the upper face of the same, straps secured to the body and arranged to pass over the cow, and yielding devices interposed in said straps.

14. In a cow-milker, the combination with a body having spaced teat-engaging elements, of a rigid udder-pressing device located upon the body between the teat-engaging elements and projecting above the upper face of the same, straps arranged to pass over the cow, and coiled springs interposed between and secured to the ends of the straps and the body.

15. In a cow-milker, the combination with a body, of teat-engaging devices carried by the body, a positioning-frame pivotally connected to the body and arranged when in operative position to engage the under side of a cow, and means for holding said frame in operative position.

16. In a cow-milker, the combination with a body, of teat-engaging devices carried by the body, a positioning-frame comprising a body-band having hinge-eyes that are pivoted to the body, and a strap arranged to surround a cow, and having a detachable connection with one end of the body-band.

17. In a cow-milker, the combination with a body, of teat-engaging devices carried by the body, and leg-engaging arms also carried by the body and arranged to engage the front portions of a cow's leg to prevent kicking.

18. In a cow-milker, the combination with a body, of teat-engaging devices carried by the body, plates pivoted to the body, a strap arranged to surround a cow and connected to the free ends of the plates, and leg-engaging arms secured to the plates and arranged to engage the front portions of a cow's legs to prevent her kicking.

19. In a cow-milker, the combination with a body having open-ended teat-receptacles, of a milk-receiving funnel located beneath the body and having openings in its side walls, and spring-latches carried by the body and engaging in the openings of the funnel.

20. In a cow-milker, the combination with a body having recesses in its opposite sides, of yielding pressure-blocks having a pivotal connection with the body and movable into and out of the recesses, said blocks tapering from their upper toward their lower ends and having their inner faces disposed in inclined relation to the opposing walls of the recesses.

21. In a cow-milker, the combination with a body having open-sided teat-receiving recesses and ears located between the recesses, of pressure elements pivoted to the ears and extending in opposite directions across the recesses, and means connected to the outer ends of the pressure elements to move them into and out of said recesses.

22. In a cow-milker, the combination with a body having recesses in its opposite faces, of pressure-plates pivoted to the sides of the body between the recesses thereof and carrying yielding blocks that are movable into and out of said recesses, a rock-shaft journaled upon the body and having crank-arms, latches pivoted to the crank-arms and detachably engaging the free ends of the plate, and spring-pressed bolts mounted upon the latches to hold the same in operative position to lock the same to the plates.

In testimony that I claim the foregoing as my own I have hereto affixed my signature in the presence of two witnesses.

DAVID Y. WILSON.

Witnesses:
  H. WILSON,
  D. B. CLARK.